US009229022B2

(12) United States Patent
Kanehara et al.

(10) Patent No.: US 9,229,022 B2
(45) Date of Patent: Jan. 5, 2016

(54) DECELERATION INFORMATION NOTIFICATION DEVICE AND DECELERATION INFORMATION NOTIFICATION METHOD

(75) Inventors: Shunichi Kanehara, Yamato (JP); Koji Shionome, Yamato (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 103 days.

(21) Appl. No.: 14/119,579

(22) PCT Filed: Feb. 22, 2012

(86) PCT No.: PCT/JP2012/001187

§ 371 (c)(1), (2), (4) Date: Nov. 22, 2013

(87) PCT Pub. No.: WO2012/164784

PCT Pub. Date: Dec. 6, 2012

(65) Prior Publication Data

US 2014/0097950 A1 Apr. 10, 2014

(30) Foreign Application Priority Data

May 27, 2011 (JP) ................................ 2011-119614

(51) Int. Cl.

| | |
|---|---|
| ***B60Q 1/00*** | (2006.01) |
| ***G01P 1/07*** | (2006.01) |
| ***B60W 50/14*** | (2012.01) |
| *B60W 30/18* | (2012.01) |

(52) U.S. Cl.

CPC ... *G01P 1/07* (2013.01); *B60Q 1/00* (2013.01); *B60W 50/14* (2013.01); *B60W 30/18127* (2013.01); *B60W 2510/0657* (2013.01); *B60W 2520/105* (2013.01); *B60W 2540/10* (2013.01)

(58) Field of Classification Search

CPC ................ B60W 2710/083; B60W 2710/085; B60W 10/06; B60W 10/08; B60W 10/10; B60W 30/18127; B60W 2510/0657; B60L 2240/423; B60Q 1/00; G01P 1/07

USPC ................. 340/439, 441; 701/22, 54, 70, 84; 180/65.1, 65.2, 65.21, 65.27

See application file for complete search history.

(56) References Cited

U.S. PATENT DOCUMENTS

| | | | | |
|---|---|---|---|---|
| 6,131,693 | A * | 10/2000 | Mukai et al. | 180/446 |
| 7,876,913 | B2 | 1/2011 | Kobayashi et al. | |
| 2007/0017735 | A1 * | 1/2007 | Kataoka et al. | 180/446 |
| 2007/0223727 | A1 | 9/2007 | Kobayashi et al. | |
| 2008/0186157 | A1 * | 8/2008 | Steinle et al. | 340/453 |
| 2010/0036575 | A1 * | 2/2010 | Yurgil | 701/70 |

(Continued)

FOREIGN PATENT DOCUMENTS

| | | | |
|---|---|---|---|
| JP | 2003-220852 | A | 8/2003 |
| JP | 2007-256838 | A | 10/2007 |
| JP | 4173891 | B2 | 10/2008 |

(Continued)

*Primary Examiner* — Hung T Nguyen
(74) *Attorney, Agent, or Firm* — Foley & Lardner LLP

(57) ABSTRACT

The present invention is intended to notify vehicle deceleration information more accurately. When an engine torque Te has a negative value, a sound volume adjustment coefficient kt is calculated depending on the engine torque Te, and a sound volume is adjusted depending on the sound volume adjustment coefficient kt. The sound volume adjustment coefficient kt is set to have a larger value as the absolute value of the engine torque Te becomes larger.

12 Claims, 11 Drawing Sheets

13
ENGINE TORQUE SENSOR 11
I/F
SOUND VOLUME ADJUSTMENT LINEAR EXPRESSION STORAGE UNIT 21
FREQUENCY CHARACTERISTIC STORAGE UNIT 23
SIGN DETERMINING UNIT 27
OUTPUT FREQUENCY CALCULATING UNIT 24
SOUND VOLUME ADJUSTMENT MEMBER CALCULATING UNIT 22
OUTPUT SIGNAL DETERMINING UNIT 25
OUTPUT SIGNAL VOLTAGE CONVERSION UNIT 26
14 AMPLIFIER
15 SPEAKER

(56) References Cited

U.S. PATENT DOCUMENTS

2010/0055649 A1 3/2010 Takahashi et al.
2010/0191400 A1* 7/2010 Ajiro ............................... 701/22
2010/0235063 A1* 9/2010 Kawamoto et al. ............. 701/70
2011/0060487 A1* 3/2011 Jess et al. ........................ 701/22
2011/0125357 A1* 5/2011 Harumoto et al. .............. 701/22

FOREIGN PATENT DOCUMENTS

JP 2010-61330 A 3/2010
WO WO 2010/013617 A1 2/2010

* cited by examiner

DECELERATION INFORMATION NOTIFICATION DEVICE AND DECELERATION INFORMATION NOTIFICATION METHOD

TECHNICAL FIELD

The present invention relates to a deceleration information notification device and a deceleration information notification method.

BACKGROUND ART

In the related art described in Patent Document 1, a sound pressure of a sound effect is adjusted depending on the rotational frequency of an engine, and the output of the sound effect is stopped when a variation per unit time of the rotational frequency is greater than a predetermined value.

PRIOR ART DOCUMENT

Patent Document

Patent Document 1: Japanese Patent No. 4173891

SUMMARY OF THE INVENTION

Problem to be Solved

As described in the related art, when the output of a sound effect is stopped on the basis of the variation of the rotational frequency per unit time, it is difficult to accurately notify a deceleration situation such as a driver's intention of deceleration or a vehicle deceleration state to a driver.

An object of the present invention is to more accurately notify a deceleration situation such as a driver's intention of deceleration or a vehicle deceleration state to a driver.

Solution to the Problem

According to an aspect of the present invention, there is provided a vehicle deceleration degree control device which detects a drive torque of a rotational drive source, sets deceleration information indicating at least one of a driver's intention of deceleration and a vehicle deceleration state depending on the drive torque when the drive torque has a negative value, and notifies the set deceleration information to a driver.

Advantageous Effects of the Invention

According to the vehicle deceleration degree control device of the aspect of the present invention, since the degree of notification of the deceleration situation is adjusted depending on the drive torque having a negative value, it is possible to more accurately notify the deceleration situation such as a driver's intention of deceleration or a vehicle deceleration state.

DESCRIPTION OF EMBODIMENTS

Hereinafter, embodiments of the present invention will be described with reference to the accompanying drawings.

First Embodiment

Configuration

Figure 1:
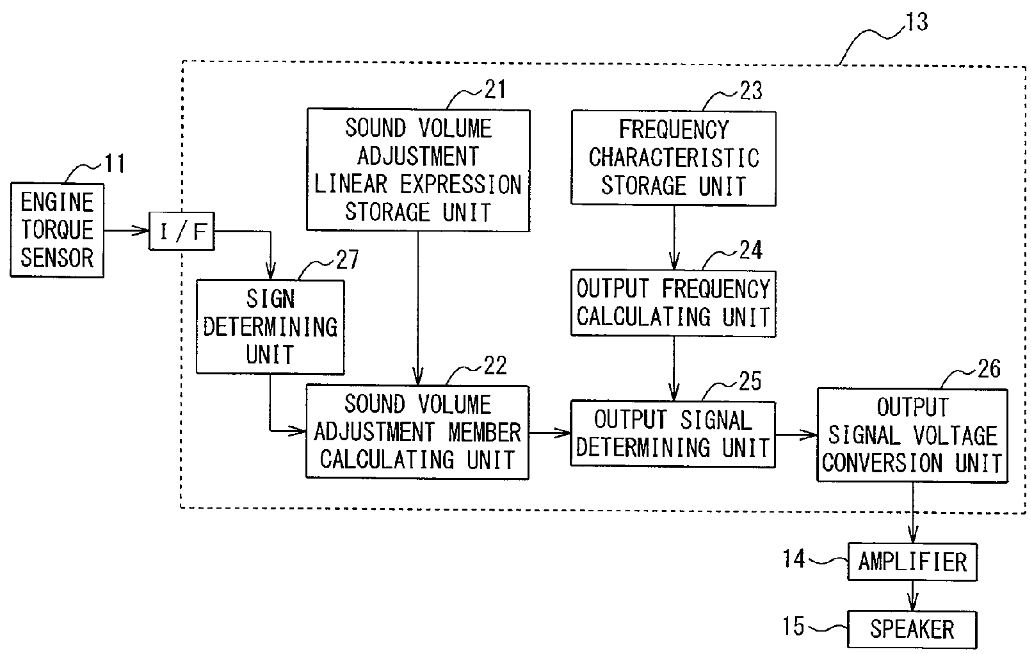
FIG. 1 is a system configuration diagram illustrating a deceleration information notification device.

FIG. 1 is a system configuration diagram illustrating a deceleration information notification device.

In this embodiment, the deceleration information notification device includes an engine torque sensor 11 detecting an engine torque Te, a control unit 13 constituted, for example, of a microcomputer, an amplifier 14, and a speaker 15. The engine torque sensor 11 corresponds to a "drive torque detecting unit", the control unit 13 corresponds to a "deceleration information setting unit", and the speaker 15 corresponds to a "notification unit".

Instead of using the engine torque sensor 11, the engine torque Te may be acquired through CAN communications or the engine torque Te may be calculated on the basis of an engine speed, a transmission gear ratio, a vehicle speed, and the like.

While the case where the rotational drive source is an engine is described, in the case where a hybrid electric vehicle (HEV) travels with a motor or when an electric vehicle (EV) travels, a motor torque is detected as the drive torque of the rotational drive source.

The control unit 13 includes a sound volume adjustment linear expression storage unit 21, a sound volume adjustment member calculating unit 22, a frequency characteristic storage unit 23, an output frequency calculating unit 24, an output signal determining unit 25, an output signal voltage conversion unit 26, and a sign determining unit 27.

The control unit 13 performs a deceleration situation notification control process and notifies a deceleration situation to a driver by causing the driver to hear a sound of which the sound volume varies depending on the deceleration situation (such as a driver's intention of deceleration or a vehicle deceleration state) in real time. The sound volume is adjusted by acquiring a signal indicating the engine torque Te, and by using a sound volume adjustment coefficient kt when the engine torque has a negative value, the sound value adjustment coefficient kt being determined depending on the engine torque Te.

The deceleration situation notification control process which is performed every predetermined time (for example, 10 msec) by the control unit 13 will be described below.

Figure 2:
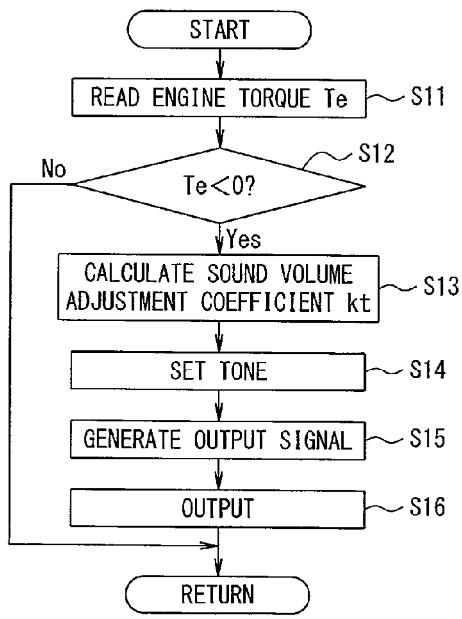
FIG. 2 is a flowchart illustrating a deceleration situation notification control process.

FIG. 2 is a flowchart illustrating the deceleration situation notification control process.

First, in step S11, the engine torque Te is read.

Subsequently, in step S12 corresponding to a process by the sign determining unit 27, it is determined whether the engine torque Te has a negative value. When the determination result is "Te≥0", it is determined that deceleration information indicating the intention of deceleration or the deceleration state is not necessary and the process returns to a predetermined main program. On the other hand, when the determination result is "Te<0", the process progresses to step S13 to notify deceleration information to a driver.

Subsequently, in step S13 corresponding to a process by the sound volume adjustment member calculating unit 22, the sound volume adjustment coefficient kt depending on the engine torque Te is calculated using a sound volume adjustment linear expression stored in the sound volume adjustment linear expression storage unit 21. The sound volume adjustment linear expression is set so that as the larger the absolute value of the engine torque Te is (the larger in the negative direction), the larger the sound volume adjustment coefficient kt is.

Subsequently, in step S14 corresponding to a process by the output frequency calculating unit 24, a tone (deceleration sound) depending on an order component of the engine torque is set from sound source data.

The sound source data is a wav file, a midi file or the like stored in advance in the frequency characteristic storage unit 23 of the control unit 13. The sound source data can be changed through an external terminal such as a USB, or can be selected from preset files and can be rewritten.

Subsequently, in step S15 corresponding to a process by the output signal determining unit 25, an output signal is generated depending on the sound volume adjustment coefficient kt and the tone depending on the order component of the engine torque.

Subsequently, in step S16 corresponding to a process by the output signal voltage conversion unit 26, the voltage of the output signal is converted, the output signal is output to the amplifier 14, and the deceleration sound is output through the speaker 15.

Operation

At least one of a driver's intention of deceleration and a vehicle deceleration state is notified as a deceleration situation to a driver by the use of a sound volume.

Specifically, when the engine torque Te has a negative value ("YES" in step S12), the sound volume adjustment coefficient kt is calculated depending on the engine torque Te (step S13) and a deceleration sound with the sound volume adjusted depending on the sound volume adjustment coefficient kt is output (steps S14 to S16).

In this way, since the degree of notification of the deceleration situation is adjusted depending on the engine torque Te having a negative value, it is possible to more accurately notify the deceleration situation such as a driver's intention of deceleration or a vehicle deceleration state.

That is, at the time of deceleration by an engine brake, the engine torque Te has a negative value, and the larger the absolute value thereof is, the larger the degree of deceleration by the engine brake is. Therefore, information on the engine torque Te is acquired in real time and the sound volume of the deceleration sound increases as the absolute value of the engine torque Te increases, when the engine torque Te has a negative value. In this way, by controlling the sound volume depending on the engine torque Te correlated with the degree of deceleration by the engine brake, it is possible to more appropriately control the sound volume with regard to the vehicle deceleration.

In this configuration, the engine torque sensor 11 corresponds to the "drive torque detecting unit", the control unit 13 corresponds to the "deceleration information setting unit", and the speaker 15 corresponds to the "notification unit".

Effects (1) According to the deceleration information notification device, when the engine torque Te has a negative value, the sound volume of the deceleration sound is adjusted depending on the engine torque Te and the deceleration sound is transmitted to a driver.

In this way, since the degree of notification of the deceleration situation is adjusted depending on the engine torque Te having a negative value, it is possible to more accurately notify the deceleration situation such as a driver's intention of deceleration or a vehicle deceleration state.

(2) According to the deceleration information notification device, deceleration information is notified to a driver by outputting a deceleration sound through the speaker 15.

Accordingly, it is possible to easily notify the deceleration information to the driver.

(3) According to the deceleration information notification method, when the engine torque Te has a negative value, the sound volume of the deceleration sound is adjusted depending on the engine torque Te and the deceleration sound is transmitted to a driver.

In this way, since the degree of notification of the deceleration situation is adjusted depending on the engine torque Te having a negative value, it is possible to more accurately notify the deceleration situation such as a driver's intention of deceleration or a vehicle deceleration state.

Second Embodiment

Configuration

In this embodiment, a map instead of the sound volume adjustment linear expression is referred to at the time of calculating a sound volume adjustment coefficient kt.

Figure 3:
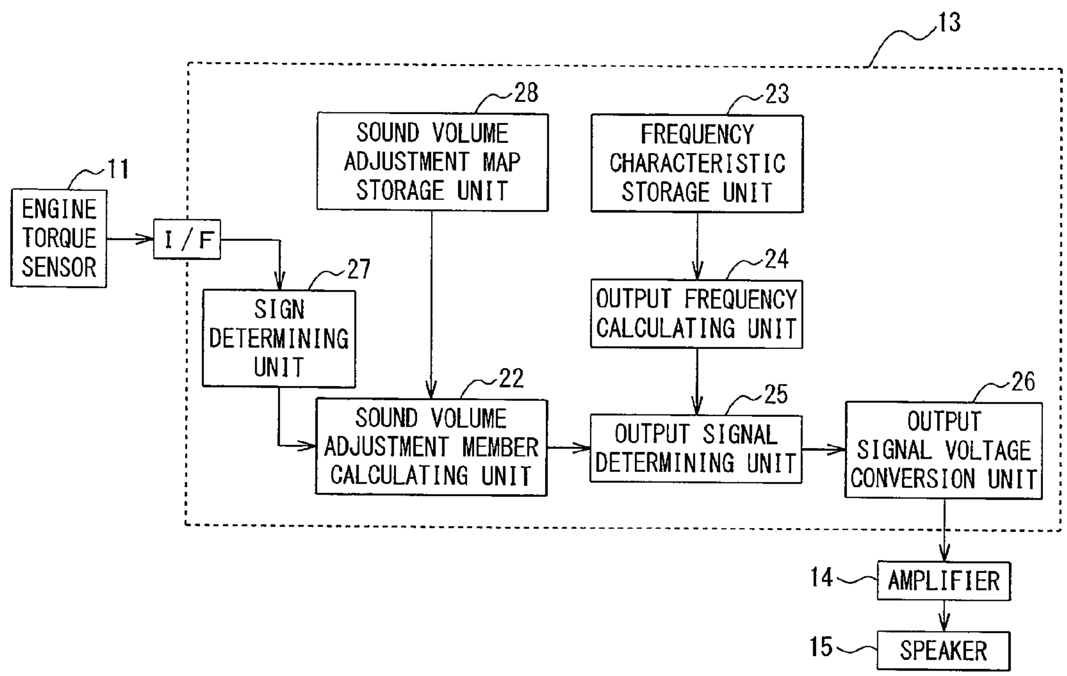
FIG. 3 is a system configuration diagram illustrating a deceleration information notification device according to a second embodiment.

FIG. 3 is a system configuration diagram illustrating a deceleration information notification device according to a second embodiment.

The control unit 13 includes a sound volume adjustment map storage unit 28, a sound volume adjustment member calculating unit 22, a frequency characteristic storage unit 23, an output frequency calculating unit 24, an output signal determining unit 25, an output signal voltage conversion unit 26, and a sign determining unit 27.

Figure 4:
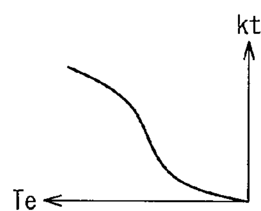
FIG. 4 is a diagram illustrating a map which is used to calculate a sound volume adjustment coefficient kt.

FIG. 4 is a diagram illustrating a map which is used to calculate the sound volume adjustment coefficient kt.

In this map, the larger the engine torque Te is in the negative direction, the larger the sound volume adjustment coefficient kt is. The characteristic line has an inverted S shape. That is, the increasing rate of the sound volume adjustment coefficient kt with respect to the engine torque Te is set to be small in a region in which the absolute value of the engine torque Te is small and a region in which the absolute value of the engine torque Te is large and to be large in an intermediate region therebetween.

Operation

When the engine torque Te has a negative value ("YES" in step S12), the sound volume adjustment coefficient kt is calculated depending on the engine torque Te with reference to the map shown in FIG. 4 (step S13) and the sound volume is adjusted depending on the sound volume adjustment coefficient kt.

In this way, since the degree of notification of the deceleration situation is adjusted depending on the engine torque Te having a negative value, it is possible to more accurately notify the deceleration situation such as a driver's intention of deceleration or a vehicle deceleration state.

By using the map for controlling, it is possible to control the sound volume having a degree of freedom. That is, the sound volume can be adjusted depending on a background noise or an engine or transmission state of a vehicle and thus the degree of freedom increases. By setting the characteristic line to an inverted S shape, it is possible to effectively transmit the deceleration sound to the driver when the degree of deceleration gradually increases, i.e., when it is necessary to learn that the vehicle is decelerated since a speed decreasing rate increases.

Effects (1) According to the deceleration information notification device, the map which defines the sound volume adjustment coefficient kt depending on the engine torque Te is referred to.

In this way, by using the map for controlling, it is possible to easily control the sound volume with a degree of freedom.

Third Embodiment

Configuration

In this embodiment, when the absolute value of the engine torque Te is larger than a threshold value th, the sound volume of a deceleration sound is adjusted.

Figure 5:
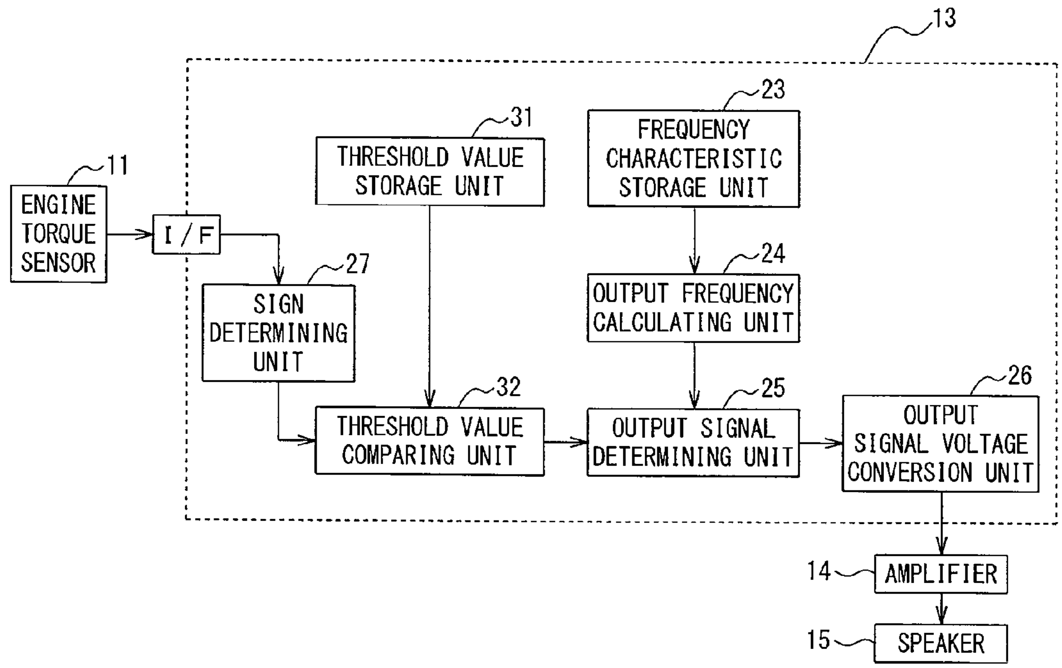
FIG. 5 is a system configuration diagram illustrating a deceleration information notification device according to a third embodiment.

FIG. 5 is a system configuration diagram illustrating a deceleration information notification device according to a third embodiment.

The control unit 13 includes a threshold value storage unit 31, a threshold value comparing unit 32, a frequency characteristic storage unit 23, an output frequency calculating unit 24, an output signal determining unit 25, an output signal voltage conversion unit 26, and a sign determining unit 27.

Figure 6:
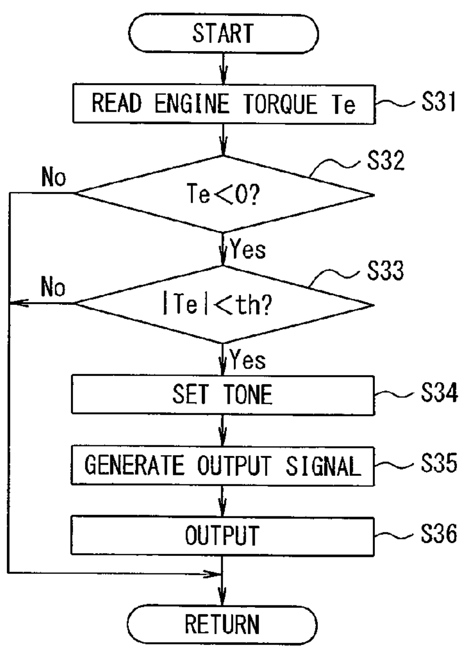
FIG. 6 is a flowchart illustrating a deceleration situation notification control process according to the third embodiment.

FIG. 6 is a flowchart illustrating a deceleration situation notification control process according to the third embodiment.

First, in step S31, the engine torque Te is read.

Subsequently, in step S32 corresponding to a process by the sign determining unit 27, it is determined whether the engine torque Te has a negative value. When the determination result is "Te≥0", it is determined that deceleration information indicating the intention of deceleration or the deceleration state is not necessary and the process returns to a predetermined main program. On the other hand, when the determination result is "Te<0", the process progresses to step S33.

Subsequently, in step S33 corresponding to a process by the threshold value comparing unit 32, the threshold value th stored in advance in the threshold value storage unit 31 is referred to, and it is determined whether the absolute value of the engine torque Te is larger than the threshold value. When the determination result is "|Te|≤th", it is determined that the deceleration information indicating the intention of deceleration or the deceleration state is not necessary and the process returns to a predetermined main program. On the other hand, when the determination result is "|Te|>th", the process progresses to step S34 to notify the deceleration information indicating an intention of deceleration or a deceleration state to a driver.

Subsequently, in step S34 corresponding to a process by the output frequency calculating unit 24, a tone (deceleration sound) depending on an order component of the engine torque is set from sound source data.

The sound source data is a wav file, a midi file or the like stored in advance in the frequency characteristic storage unit 23 of the control unit 13. The sound source data can be changed through an external terminal such as a USB, or can be selected from preset files and can be rewritten.

Subsequently, in step S35 corresponding to a process by the output signal determining unit 25, an output signal is generated depending on the tone depending on the order component of the engine torque.

Subsequently, in step S36 corresponding to a process by the output signal voltage conversion unit 26, the voltage of the output signal is converted, the output signal is output to the amplifier 14, and the deceleration sound is output through the speaker 15.

Operation

When the engine torque Te has a negative value ("YES" in step S32) and the absolute value of the engine torque Te is larger than the threshold value th ("YES" in step S33), a deceleration sound is output (steps S34 to S36).

In this way, since the degree of notification of the deceleration situation is adjusted depending on the engine torque Te having a negative value, it is possible to more accurately notify the deceleration situation such as a driver's intention of deceleration or a vehicle deceleration state.

The threshold value th for the engine torque Te having a negative value is set and the deceleration sound is output when the absolute value |Te| of the engine torque is larger than the threshold value th. This process is performed in real time. Accordingly, since the deceleration sound can be switched on and off while maintaining a function of notifying deceleration information with a sound, it is possible to simplify control logics.

Effects (1) When the engine torque Te has a negative value ("YES" in step S32) and the absolute value of the engine torque Te is larger than the threshold value th ("YES" in step S33), deceleration information is notified to a driver.

In this way, by outputting the deceleration sound when the absolute value |Te| of the engine torque is larger than the threshold value th, it is possible to simplify control logics while maintaining the function of notifying the deceleration information with a sound.

Fourth Embodiment

Configuration

In this embodiment, a degree of notification of a deceleration situation is adjusted depending on the degree of deceleration of a vehicle.

Figure 7:
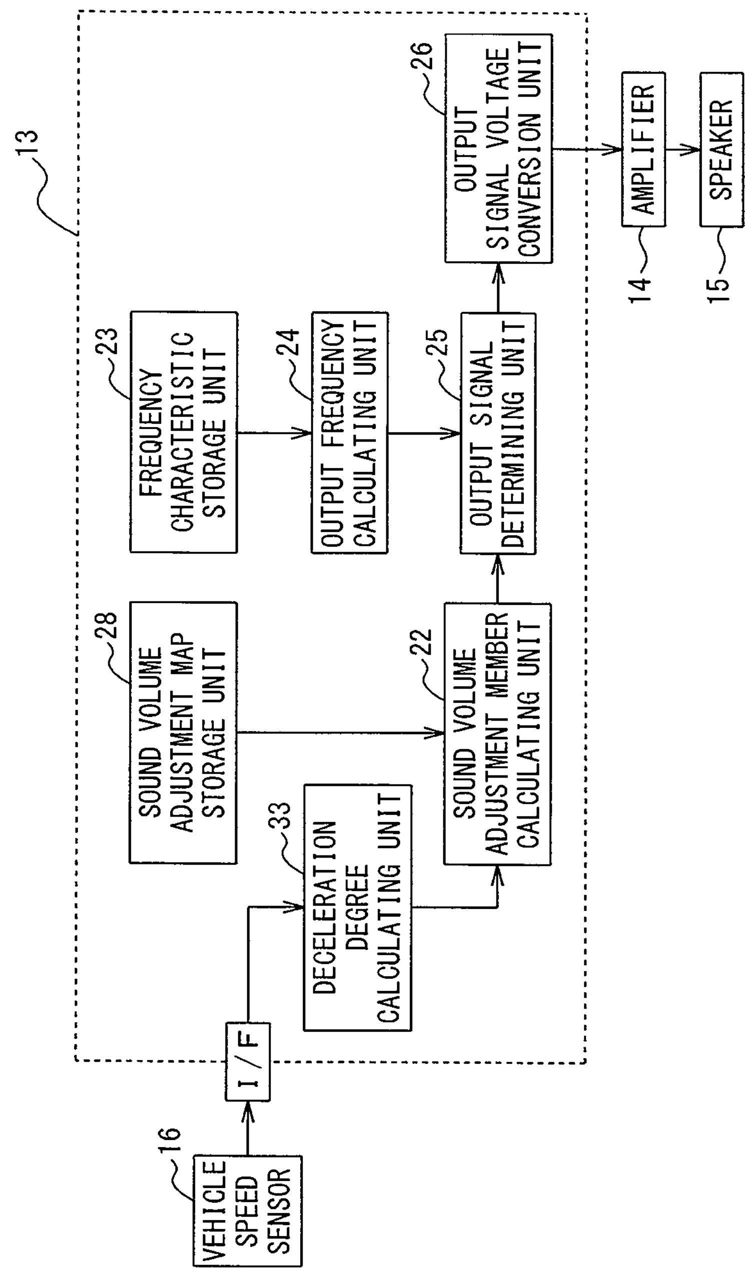
FIG. 7 is a system configuration diagram illustrating a deceleration information notification device according to a fourth embodiment.

FIG. 7 is a system configuration diagram illustrating a deceleration information notification device according to a fourth embodiment.

In this embodiment, the deceleration information notification device includes a vehicle speed sensor 16, a control unit 13 constituted, for example, of a microcomputer, an amplifier 14, and a speaker 15. Here, the control unit 13 corresponds to the "deceleration information setting unit" and the speaker 15 corresponds to the "notification unit".

The control unit 13 includes a deceleration degree calculating unit 33, a sound volume adjustment map storage unit 28, a sound volume adjustment member calculating unit 22, a frequency characteristic storage unit 23, an output frequency calculating unit 24, an output signal determining unit 25, and an output signal voltage conversion unit 26. Here, the deceleration degree calculating unit 33 corresponds to a "deceleration degree detecting unit".

The control unit 13 performs a deceleration situation notification control process and notify a deceleration situation to a driver by causing the driver to hear a sound of which the sound volume varies depending on the deceleration situation (such as a driver's intention of deceleration or a vehicle deceleration state) in real time. That is, a degree of deceleration G is calculated on the basis of a variation (for example, a derivative value) of a vehicle speed per unit time, and the map shown in FIG. 8 is referred to, and a sound volume is adjusted by using a sound volume adjustment coefficient kg determined depending on the degree of deceleration G.

Figure 8:
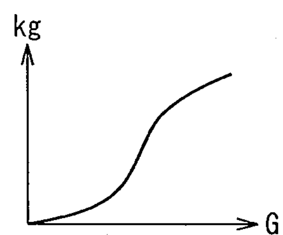
FIG. 8 is a diagram illustrating a map which is used to calculate a sound volume adjustment coefficient kg.

FIG. 8 is a diagram illustrating a map which is used to calculate the sound volume adjustment coefficient kg.

In this map, the larger the degree of deceleration G is, the larger the sound volume adjustment coefficient kt is. The characteristic line has an inverted S shape. That is, the increasing rate of the sound volume adjustment coefficient kt with respect to the degree of deceleration G is set to be small in a region in which the degree of deceleration G is small and a region in which the degree of deceleration G is large and to be large in an intermediate region therebetween.

Operation

At least one of a driver's intention of deceleration and a vehicle deceleration state is notified as the deceleration situation to a driver by the use of a sound volume. Specifically, the sound volume adjustment coefficient kg is calculated depending on the degree of deceleration G and the sound volume is adjusted depending on the sound volume adjustment coefficient kt.

In this way, since the degree of notification of the deceleration situation is adjusted depending on the degree of deceleration G, it is possible to more accurately notify the deceleration situation such as a driver's intention of deceleration or a vehicle deceleration state.

That is, information on the degree of deceleration G is acquired in real time and the sound volume of the deceleration sound increases as the degree of deceleration G increases. In this way, by controlling the sound volume depending on the degree of deceleration G by the engine brake, it is possible to more appropriately control the sound volume with regard to the degree of deceleration of the vehicle.

In this configuration, the deceleration degree calculating unit 33 corresponds to the "deceleration degree detecting unit".

Effects (1) The degree of deceleration G is calculated on the basis of the vehicle speed and the sound volume of a deceleration sound is adjusted depending on the degree of deceleration G and the deceleration sound is transmitted to a driver.

In this way, since the degree of notification of the deceleration situation is adjusted depending on the degree of deceleration G, it is possible to more accurately notify the deceleration situation such as a driver's intention of deceleration or a vehicle deceleration state.

Application Example 1

In this embodiment, the degree of deceleration G of the vehicle is calculated on the basis of a signal from the vehicle speed sensor 16, but the degree of deceleration G of vehicle may be directly detected with an acceleration sensor. According to this configuration, the process by the deceleration degree calculating unit 33 can be omitted.

Application Example 2

Figure 9:
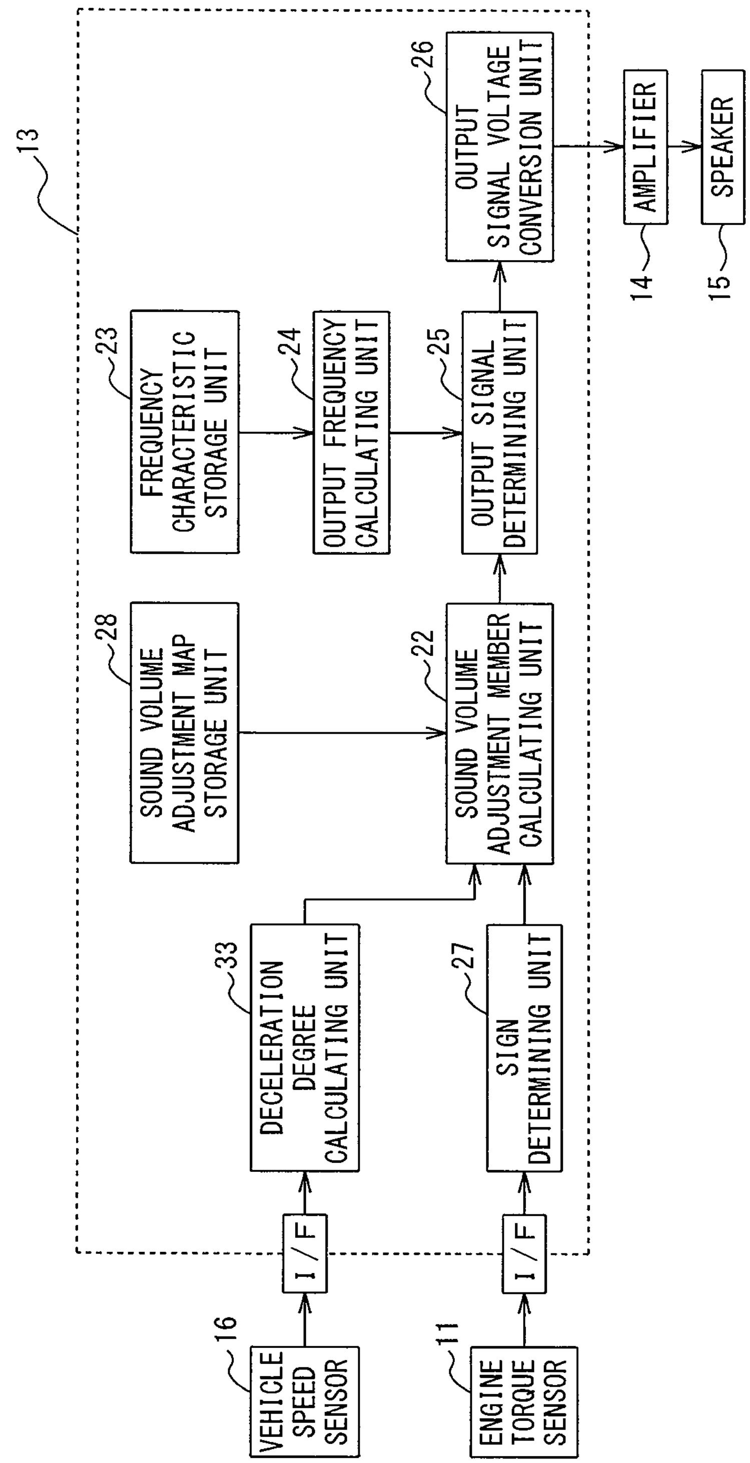
FIG. 9 is a system configuration diagram illustrating a deceleration information notification device according to application example 2 of the fourth embodiment.

In this embodiment, the sound volume of a deceleration sound is adjusted depending on only the degree of deceleration G, but the sound volume of a deceleration sound may be adjusted depending on the engine torque Te and the degree of deceleration G, as shown in FIG. 9.

FIG. 9 is a system configuration diagram illustrating a deceleration information notification device according to application example 2.

Here, the engine torque sensor 11 and the sign determining unit 27 are added. The sound volume adjustment coefficient kt is calculated depending on the engine torque Te, the sound volume adjustment coefficient kg is calculated depending on the degree of deceleration G, and the final output signal may be generated using the sum or product of the sound volume adjustment coefficients kt and kg. In this case, the weights of the sound volume adjustment coefficients kt and kg may be equal to each other (1:1 relationship) or different weights may be given thereto.

Fifth Embodiment

Configuration

In this embodiment, a degree of notification of a deceleration situation is adjusted depending on a regeneration amount of a regeneration brake in a hybrid vehicle (HEV) or an electric vehicle (EV).

Figure 10:
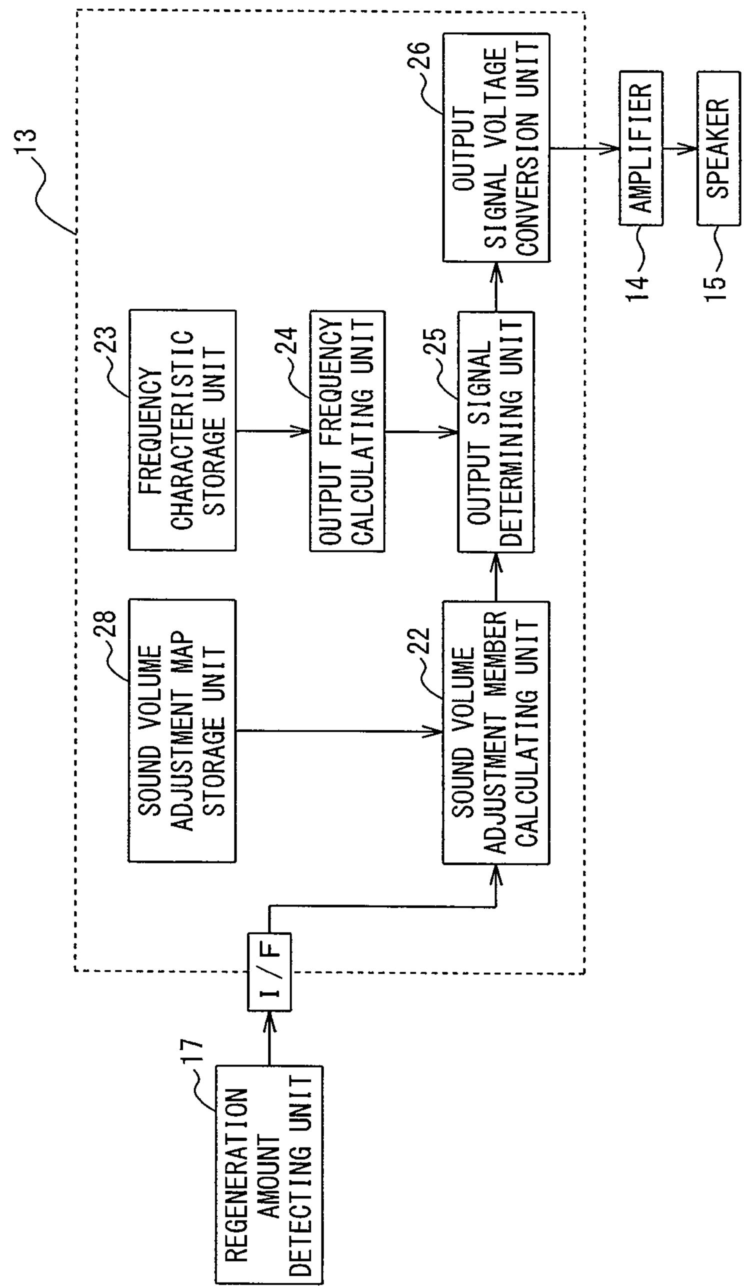
FIG. 10 is a system configuration diagram illustrating a deceleration information notification device according to a fifth embodiment.

FIG. 10 is a system configuration diagram illustrating a deceleration information notification device according to a fifth embodiment.

In this embodiment, the deceleration information notification device includes a regeneration amount detecting unit 17, a control unit 13 constituted, for example, of a microcomputer, an amplifier 14, and a speaker 15. Here, the control unit 13 corresponds to the "deceleration information setting unit" and the speaker 15 corresponds to the "notification unit".

The regeneration amount detecting unit 17 detects, for example, a target degree of deceleration or a regenerative torque instruction value in the regeneration brake, as the regeneration amount B. Here, the regeneration amount detecting unit 17 corresponds to a “regeneration amount detecting unit”.

The control unit 13 includes a sound volume adjustment map storage unit 28, a sound volume adjustment member calculating unit 22, a frequency characteristic storage unit 23, an output frequency calculating unit 24, an output signal determining unit 25, and an output signal voltage conversion unit 26.

The control unit 13 performs a deceleration situation notification control process and notifies a deceleration situation to a driver by causing the driver to hear a sound of which the sound volume varies depending on the deceleration situation (such as a driver’s intention of deceleration or a vehicle deceleration state) in real time. That is, the map shown in FIG. 11 is referred to, and the sound volume is adjusted using the sound volume adjustment coefficient kb determined depending on the regeneration amount B.

Figure 11:
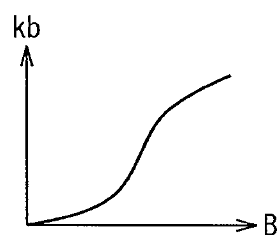
FIG. 11 is a diagram illustrating a map which is used to calculate a sound volume adjustment coefficient kb.

FIG. 11 is a diagram illustrating a map which is used to calculate the sound volume adjustment coefficient kb.

In this map, the larger the regeneration amount B is, the larger the sound volume adjustment coefficient kb is. The characteristic line has an inverted S shape. That is, the increasing rate of the sound volume adjustment coefficient kb with respect to the regeneration amount B is set to be small in a region in which the regeneration amount B is small and a region in which the regeneration amount B is large and to be large in an intermediate region therebetween.

Operation

At least one of a driver’s intention of deceleration and a vehicle deceleration state is notified as the deceleration situation to a driver by the use of a sound volume. Specifically, the sound volume adjustment coefficient kb is calculated depending on the regeneration amount B and the sound volume is adjusted depending on the sound volume adjustment coefficient kb.

In this way, since the regeneration amount B correlated with the degree of deceleration of the vehicle is detected and the degree of notification of the deceleration situation is adjusted depending on the regeneration amount B, it is possible to more accurately notify the deceleration situation such as a driver’s intention of deceleration or a vehicle deceleration state.

That is, information on the regeneration amount B is acquired in real time and the sound volume of the deceleration sound increases as the regeneration amount B increases. In this way, by controlling the sound volume depending on the regeneration amount of the regeneration brake, it is possible to more appropriately control the sound volume with regard to the vehicle deceleration situation.

Since the regeneration amount B of a regeneration braking system is used, it is possible to notify the deceleration information to a driver without newly adding a sensor detecting an engine torque, a vehicle speed, a degree of deceleration, or the like.

In this configuration, the regeneration amount detecting unit 17 corresponds to the “regeneration amount detecting unit”.

Effects (1) The regeneration amount B of the regeneration brake is calculated and the sound volume of a deceleration sound is adjusted depending on the regeneration amount B and the deceleration sound is transmitted to a driver.

In this way, since the degree of notification of the deceleration situation is adjusted depending on the regeneration amount B, it is possible to more accurately notify the deceleration situation such as a driver’s intention of deceleration or a vehicle deceleration state.

Application Example 1

Figure 12:
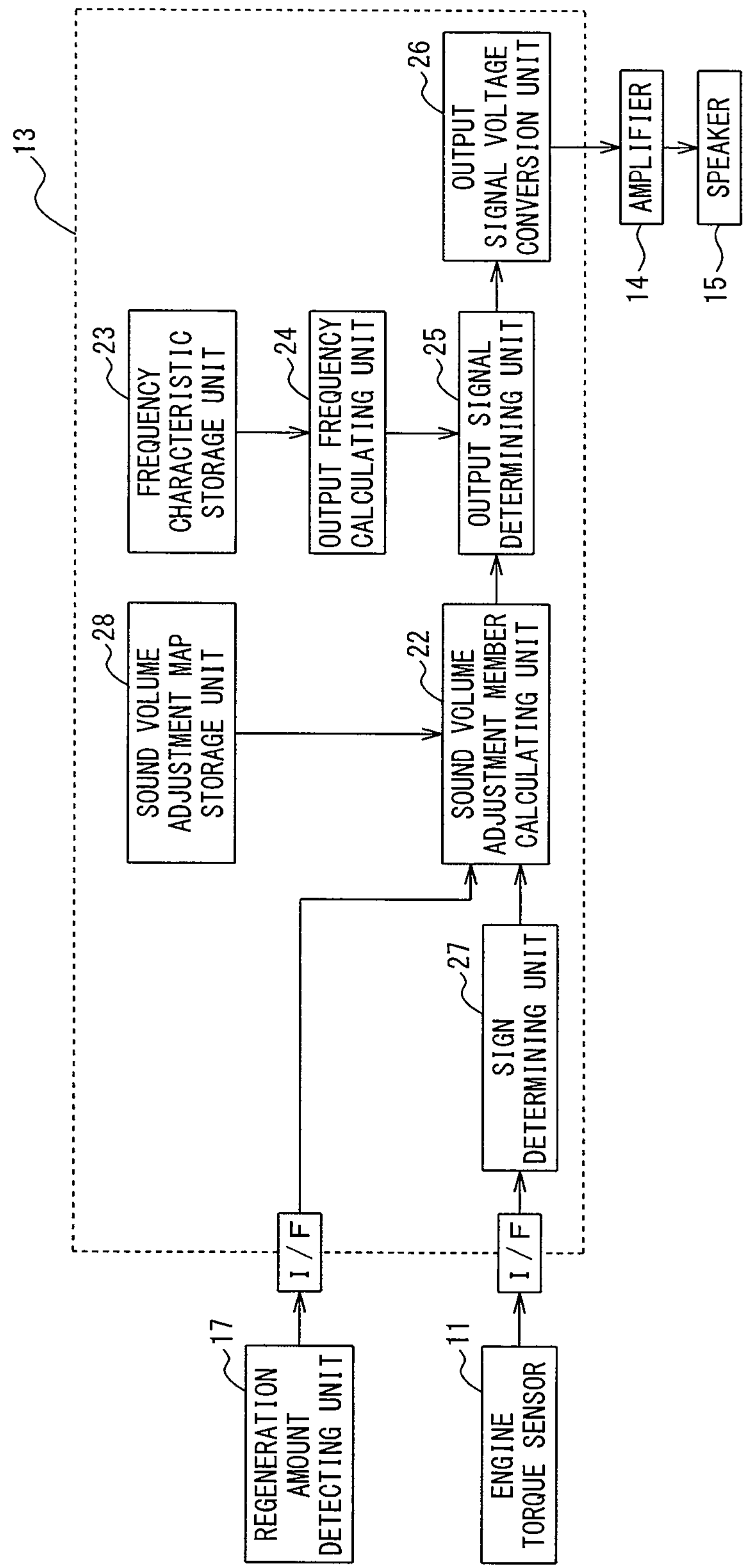
FIG. 12 is a system configuration diagram illustrating a deceleration information notification device according to application example 1 of the fifth embodiment.

In this embodiment, the sound volume of a deceleration sound is adjusted depending on only the regeneration amount B, but the sound volume of a deceleration sound may be adjusted depending on the engine torque Te and the regeneration amount B, as shown in FIG. 12.

FIG. 12 is a system configuration diagram illustrating a deceleration information notification device according to application example 1.

Here, the engine torque sensor 11 and the sign determining unit 27 are added. The sound volume adjustment coefficient kt is calculated depending on the engine torque Te, the sound volume adjustment coefficient kb is calculated depending on the regeneration amount B, and the final output signal may be generated using the sum or product of the sound volume adjustment coefficients kt and kb. In this case, the weights of the sound volume adjustment coefficients kt and kb may be equal to each other (1:1 relationship) or different weights may be given thereto.

Sixth Embodiment

Configuration

In this embodiment, a deceleration state is notified to a driver through the use of a lamp.

Figure 13:
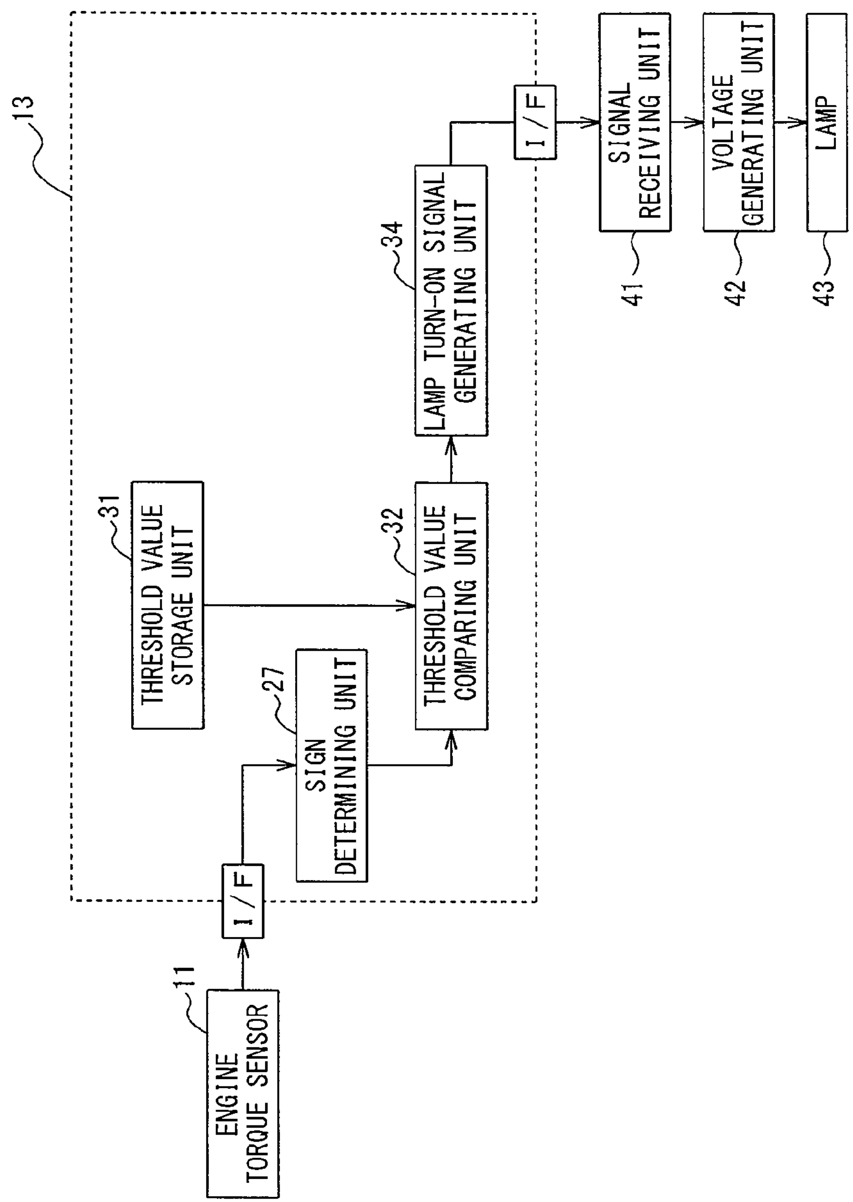
FIG. 13 is a system configuration diagram illustrating a deceleration information notification device according to a sixth embodiment.

FIG. 13 is a system configuration diagram illustrating a deceleration information notification device according to a sixth embodiment.

In this embodiment, the deceleration information notification device includes an engine torque sensor 11, a control unit 13 constituted, for example, of a microcomputer, a signal receiving unit 41, a voltage generating unit 42, and a lamp 43. Here, the engine torque sensor 11 corresponds to the “drive torque detecting unit”, the control unit 13 corresponds to the “deceleration information setting unit”, and the lamp 43 corresponds to the “notification unit”.

The lamp 43 is disposed at a position which can be viewed by a driver.

The control unit 13 includes a sound volume adjustment map storage unit 28, a threshold value storage unit 31, a threshold value comparing unit 32, and a lamp turn-on signal generating unit 34.

The control unit 13 performs a deceleration situation notification control process and notifies a deceleration situation to a driver by turning on the lamp 43 depending on the deceleration situation (such as a driver’s intention of deceleration or a vehicle deceleration state). That is, when the engine torque Te is larger than the threshold value th, the lamp 43 is turned on.

Operation

In this embodiment, the deceleration situation can be notified to a driver by turning on the lamp 43, i.e., by a display. Therefore, even in a traveling scene in which a sound cannot be heard well due to an influence of an external environment or an influence from a road surface, a driver can visually recognize the deceleration situation.

In this configuration, the lamp 43 corresponds to the "notification unit".

Effects (1) According to the deceleration information notification device, it is possible to notify deceleration information to a driver by turning on the lamp 43.

Accordingly, it is possible to easily notify deceleration information to a driver. In addition, even in a traveling scene in which a sound cannot be heard well due to an influence of an external environment or an influence from a road surface, a driver can visually recognize the deceleration situation.

Seventh Embodiment

Configuration

In this embodiment, a deceleration state is notified to a driver through the use of a vibration generator.

Figure 14:
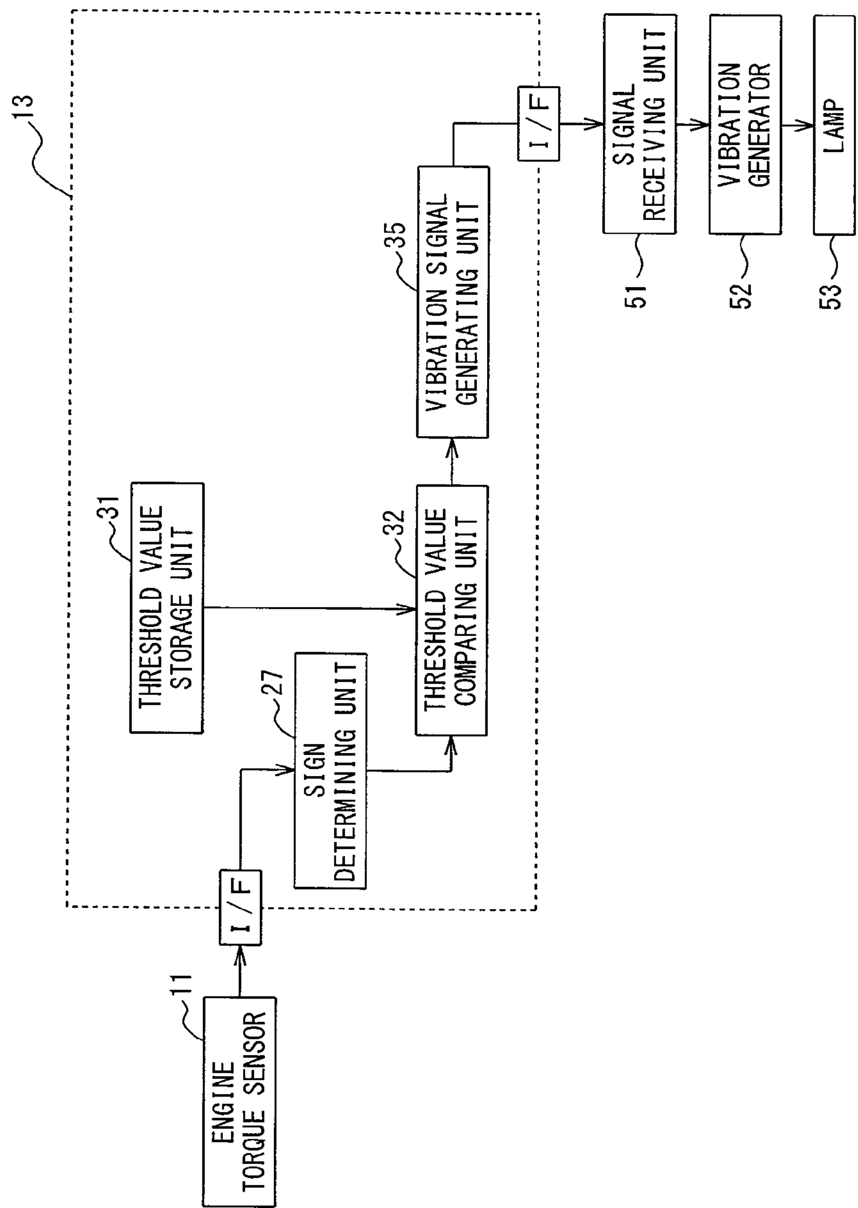
FIG. 14 is a system configuration diagram illustrating a deceleration information notification device according to a seventh embodiment.

FIG. 14 is a system configuration diagram illustrating a deceleration information notification device according to a seventh embodiment.

In this embodiment, the deceleration information notification device includes an engine torque sensor 11, a control unit 13 constituted, for example, of a microcomputer, a signal receiving unit 51, a vibration generator 52, and a lamp 53. Here, the engine torque sensor 11 corresponds to the "drive torque detecting unit", the control unit 13 corresponds to the "deceleration information setting unit", and the vibration generator 52 and the lamp 53 correspond to the "notification unit".

The vibration generator 52 is disposed in a steering wheel.

The lamp 53 is disposed at a position which can be viewed by a driver.

The control unit 13 includes a sound volume adjustment map storage unit 28, a threshold value storage unit 31, a threshold value comparing unit 32, and a vibration signal generating unit 35.

The control unit 13 performs a deceleration situation notification control process and notifies a deceleration situation to a driver by causing the vibration generator 52 to vibrate and turning on the lamp 53 depending on the deceleration situation (such as a driver's intention of deceleration or a vehicle deceleration state). That is, when the engine torque Te is larger than the threshold value th, the vibration generator 52 is caused to vibrate and the lamp 53 is turned on.

Operation

In this embodiment, the deceleration situation can be notified to a driver by causing the vibration generator 52 to vibrate and turning on the lamp 53. Therefore, even in a traveling scene in which a sound cannot be heard well due to an influence of an external environment or an influence from a road surface, a driver can tactually and visually recognize the deceleration situation.

In this configuration, the vibration generator 52 and the lamp 53 correspond to the "notification unit".

Effects (1) According to the deceleration information notification device, it is possible to notify deceleration information to a driver by causing the vibration generator 52 to vibrate.

Accordingly, it is possible to easily notify deceleration information to a driver. In addition, even in a traveling scene in which a sound cannot be heard well due to an influence of an external environment or an influence from a road surface, a driver can visually recognize the deceleration situation.

Priority is claimed on Japanese Patent Application No. 2011-119614 (filed on May 27, 2011), the contents of which are incorporated herein by reference.

While the present invention is described with reference to a definite number of embodiments, the scope of the present invention is not limited to the embodiments but modifications of the embodiments based on the above disclosure are obvious to those skilled in the art.

REFERENCE SIGNS LIST

11: engine torque sensor
13: control unit
14: amplifier
15: speaker
16: vehicle speed sensor
17: regeneration amount detecting unit
21: sound volume adjustment linear expression storage unit
22: sound volume adjustment member calculating unit
23: frequency characteristic storage unit
24: output frequency calculating unit
25: output signal determining unit
26: output signal voltage conversion unit
27: sign determining unit
28: sound volume adjustment map storage unit
31: threshold value storage unit
32: threshold value comparing unit
33: deceleration degree calculating unit
34: lamp turn-on signal generating unit
35: vibration signal generating unit
41: signal receiving unit
42: voltage generating unit
43: lamp
51: signal receiving unit
52: vibration generator
53: lamp

The invention claimed is:

1. A deceleration information notification device comprising:

a drive torque detecting unit for detecting a drive torque of a rotational drive source;

a regeneration amount detecting unit for detecting a regeneration amount of a regeneration brake;

a deceleration information setting unit for setting deceleration information indicating at least one of an intention of deceleration of a driver or a vehicle deceleration state depending on the drive torque and the regeneration amount detected by the regeneration amount detecting unit when the drive torque detected by the drive torque detecting unit has a negative value; and a notification unit for notifying the driver of the deceleration information set by the deceleration information setting unit, wherein the deceleration information setting unit refers to a map which defines a degree of notification of the deceleration information depending on the drive torque detected by the drive torque detecting unit to determine the degree of the notification, and wherein an increasing rate of the degree of notification with respect to the drive torque is set to be small in a region in which an absolute value of the drive torque is small and a region in which the absolute value of the drive torque is large and to be large in an intermediate region therebetween.

2. The deceleration information notification device according to claim 1, wherein the deceleration information setting unit sets the deceleration information when the drive torque detected by the drive torque detecting unit has a negative value and when the absolute value of the drive torque is larger than a predetermined threshold value.

3. The deceleration information notification device according to claim 1, wherein the notification unit notifies the driver of the deceleration information by outputting a deceleration sound from a speaker.

4. The deceleration information notification device according to claim 1, wherein the notification unit notifies the driver of the deceleration information by displaying the vehicle deceleration state on a display device.

5. The deceleration information notification device according to claim 1, wherein the notification unit notifies the driver of the deceleration information by causing a vibration generator to vibrate a steering wheel.

6. A deceleration information notification method comprising:

detecting, by a drive torque detecting unit, a drive torque of a rotational drive source;

detecting a regeneration amount of a regeneration brake;

referring to a map which defines a degree of notification of deceleration information depending on the drive torque detected by the drive torque detecting unit to determine the degree of the notification, the deceleration information indicating at least one of an intention of deceleration of a driver or a vehicle deceleration state depending on the drive torque and the regeneration amount to the driver; and notifying the driver of the deceleration information when the detected drive torque has a negative value, wherein an increasing rate of the degree of notification with respect to the drive torque is set to be small in a region in which an absolute value of the drive torque is small and a region in which the absolute value of the drive torque is large and to be large in an intermediate region therebetween.

7. A deceleration information notification device comprising:

a drive torque detecting unit for detecting a drive torque of a rotational drive source;

a regeneration amount detecting unit for detecting a regeneration amount of a regeneration brake;

a deceleration information setting unit for setting deceleration information indicating at least one of an intention of deceleration of a driver or a vehicle deceleration state depending on the drive torque and the regeneration amount detected by the regeneration amount detecting unit when the drive torque detected by the drive torque detecting unit has a negative value; and a notification unit for notifying the driver of the deceleration information set by the deceleration information setting unit, wherein the deceleration information setting unit refers to a map which defines a degree of notification of the deceleration information depending on the drive torque detected by the drive torque detecting unit to determine the degree of the notification, and wherein a characteristic line of the map has an inverted S shape.

8. The deceleration information notification device according to claim 7, wherein the deceleration information setting unit sets the deceleration information when the drive torque detected by the drive torque detecting unit has a negative value and when the absolute value of the drive torque is larger than a predetermined threshold value.

9. The deceleration information notification device according to claim 7, wherein the notification unit notifies the driver of the deceleration information by outputting a deceleration sound from a speaker.

10. The deceleration information notification device according to claim 7, wherein the notification unit notifies the driver of the deceleration information by displaying the vehicle deceleration state on a display device.

11. The deceleration information notification device according to claim 7, wherein the notification unit notifies the driver of the deceleration information by causing a vibration generator to vibrate a steering wheel.

12. A deceleration information notification method comprising:

detecting, by a drive torque detecting unit, a drive torque of a rotational drive source;

detecting a regeneration amount of a regeneration brake;

referring to a map which defines a degree of notification of deceleration information depending on the drive torque detected by the drive torque detecting unit to determine the degree of the notification, the deceleration information indicating at least one of an intention of deceleration of a driver or a vehicle deceleration state depending on the drive torque and the regeneration amount to the driver; and notifying the driver of the deceleration information when the detected drive torque has a negative value, wherein a characteristic line of the map has an inverted S shape.

* * * * *